United States Patent
Osmun et al.

[15] 3,689,111
[45] Sept. 5, 1972

[54] TUBING CONNECTION HAVING MEANS FOR DISTRIBUTING AXIALLY APPLIED FORCES

[72] Inventors: Dean W. Osmun; Damon T. Slator, both of Houston, Tex.

[73] Assignee: Bowen Tools, Inc.

[22] Filed: Oct. 27, 1970

[21] Appl. No.: 84,398

[52] U.S. Cl. ..................285/39, 29/237, 29/516, 285/370, 285/382
[51] Int. Cl. ................................................F16l 13/14
[58] Field of Search.....285/382, 382.1, 382.2, 382.4, 285/382.5, 39, 93, 27, 370; 29/516, 517, 508, 237

[56] References Cited

UNITED STATES PATENTS

| | | | |
|---|---|---|---|
| 1,907,397 | 5/1933 | Kosik | 285/382 X |
| 3,425,719 | 2/1969 | Burton | 285/382.2 |
| 1,223,591 | 4/1917 | Layne | 285/382 X |
| 2,574,625 | 11/1951 | Coss | 285/382 X |
| 3,343,252 | 9/1967 | Reesor | 29/516 X |
| 1,578,649 | 3/1926 | Ely | 29/237 X |
| 2,192,914 | 3/1940 | Ice | 285/382.2 X |

FOREIGN PATENTS OR APPLICATIONS

| | | | |
|---|---|---|---|
| 16,054 | 7/1908 | Great Britain | 285/382 |

Primary Examiner—Thomas F. Callaghan
Attorney—Pravel, Wilson & Matthews

[57] ABSTRACT

Tubing connection and method of making same, wherein an end of a tube or tubing is joined to a connector by a series of annular crimps which are formed at a tapered portion of the connector to substantially uniformly distribute pulling loads on the tube or tubing to all of such crimps. The ends of two tubes are preferably joined to a common connector to splice the tubes together.

6 Claims, 2 Drawing Figures

PATENTED SEP 5 1972
3,689,111
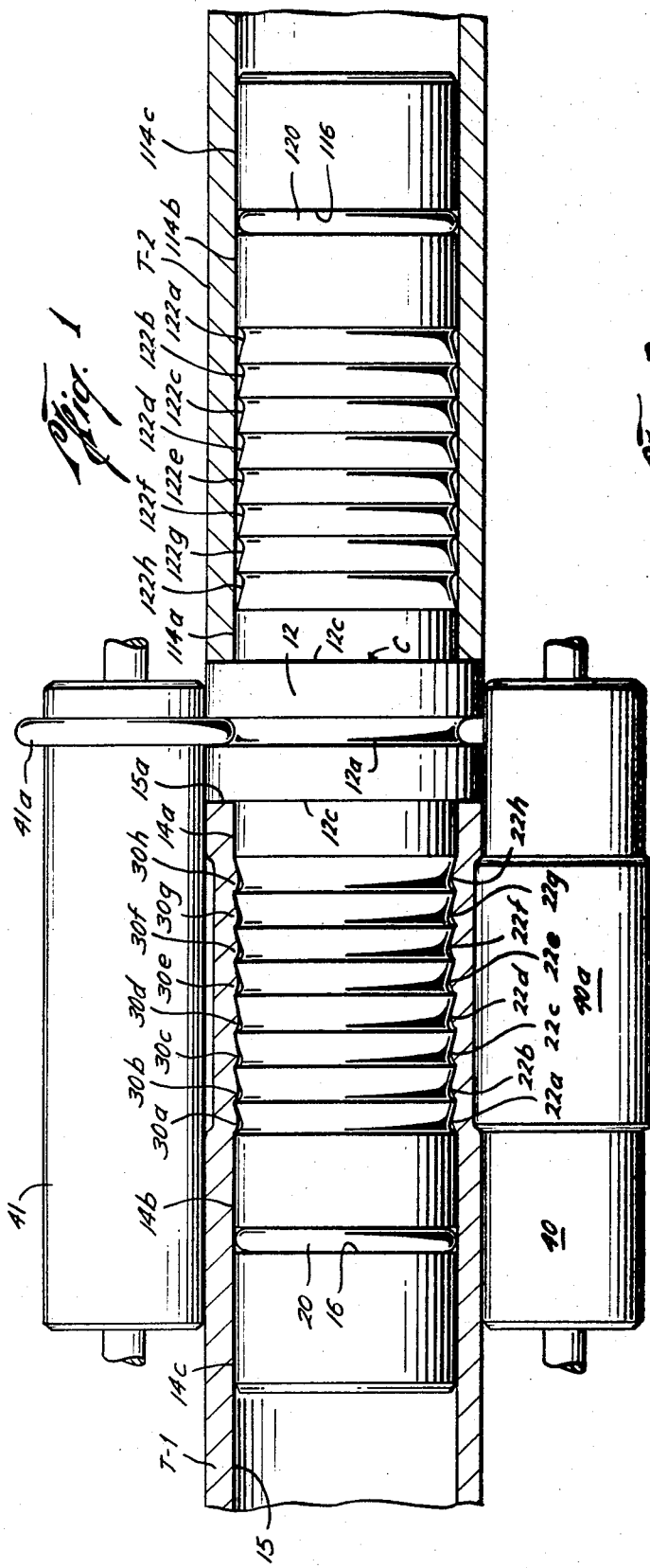
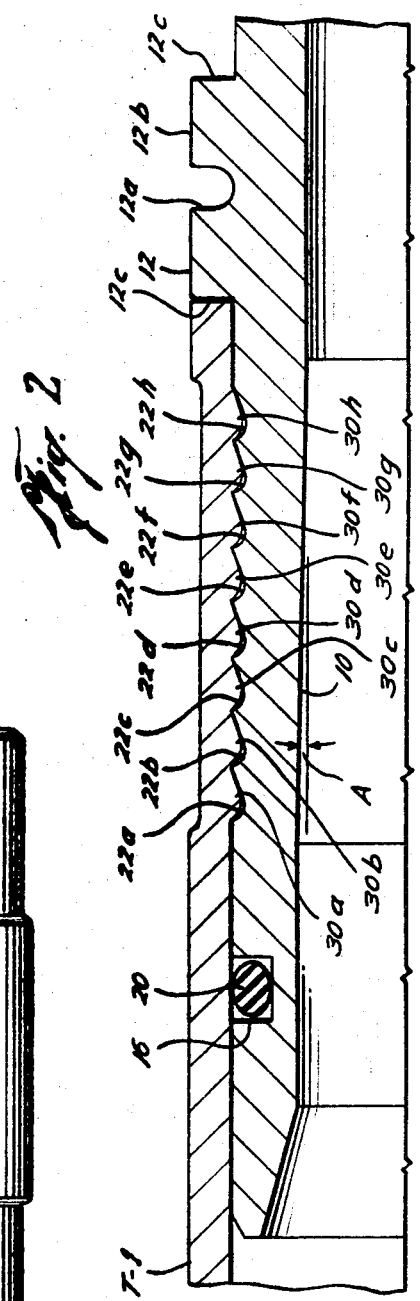
Dean W. Osmun
Damon T. Slator
INVENTORS
BY
Pravel Wilson & Matthews
ATTORNEYS

TUBING CONNECTION HAVING MEANS FOR DISTRIBUTING AXIALLY APPLIED FORCES

BACKGROUND OF THE INVENTION

The field of this invention is tubing connections and methods of making same.

Various efforts have been made in the past to mechanically connect a tube to a connector or to another tube by means of a connector, but so far as is known, most of such connections have failed or have been otherwise unsatisfactory.

SUMMARY OF THE INVENTION

The present invention relates to a tubing connection and method of making same, wherein at least one tube has a connector inserted into its bore, and a mechanical connection is made therebetween by forming a plurality of annular crimps therein in proximity to a tapered portion of the connector so as to distribute longitudinal pulling forces acting on the tube to all of such crimps, whereby a satisfactory mechanical tubing connection is provided.

BRIEF DESCRIPTION OF THE DRAWINGS

FIG. 1 is a sectional view, partly in elevation, illustrating the tubing connection of this invention, with a single connector connecting two tubes or sections of tubing, and with the left-hand tube shown in the process of being connected to the connector and the right-hand tube merely positioned on the connector prior to crimping; and FIG. 2 is an enlarged sectional view of a fragmentary portion of the tubing connection of this invention, illustrating in detail specific features thereof.

In the drawings, the letter C designates generally a connector which is adapted to have tubes T-1 and T-Z connected thereto in accordance with the method of this invention. Each tube T-1 or T-2, when connected to the connector C, or some similar connector, constitutes the tubing connection of this invention, although the tubing connection may include, and normally does include, both tubes T-1 and T-2 on a single connector C. Thus, although the connector C is primarily used for splicing or connecting together two sections of tubing or tubes T-1 and T-2, the connector C may be utilized for connecting to only one of such tubing sections so that other functions of the connector are possible.

The connector C is preferably formed of metal such as steel, aluminum or an alloy, and it has a central passage or bore 10 therethrough (FIG. 2) in the preferred form of the invention. A central guide groove section 12 is formed on the external surface of the connector C with a central guide groove 12a formed therein. The external diameter 12b of the section 12 is preferably of substantially the same size as the external diameter of the major portion of each of the tubes T-1 and T-2 when they are in the final connected positions. Also, each of the radially or laterally extending sides 12c of the section 12 provides a shoulder for the abutment of the end of each of the tubes T-1 and T-2. The portion of the connector C to the left of the intermediate or central guide groove section 12 as viewed in FIGS. 1 and 2 as referred to throughout this specification as the left-hand portion of the connector C, and the principal description set forth hereinafter applies thereto, since the portion to the right of the intermediate section 12 is formed in substantially the same manner and has substantially the same construction.

To facilitate the description of the tubing connection of this invention, the left-hand portion of the connector C with the tube T-1 thereon is first hereinafter described. Thus, the left-hand connector portion has external annular surfaces 14a, 14b and 14c which all have substantially the same diameter, which diameter is of a size to fit into the bore 15 of the tube T-1 prior to any substantial alteration in the size thereof. In most instances, it is desirable to flare or enlarge the internal diameter of the bore 15 prior to inserting the connector C therein so as to prevent damage to an O-ring 20 formed of rubber or other similar sealing material and which is positioned in a groove or recess 16 in the connector C. However, as will be more evident hereinafter, any such flaring or enlargement is rolled back or otherwise reduced to the normal internal diameter of the bore 15 of the tube T-1 during the connection of the tube T-1 to the connector C.

The left-hand portion of the connector C has a plurality of annular recesses or wickers 22a through 22h, the number of which may vary, but preferably there are at least five of such annular recesses or wickers.

The inner bore 10 of the connector C is tapered at a relatively small angle as indicated at A in FIG. 2 of the drawings so that the thickness of the wall of the connector C is less in proximity to and inwardly of the outer annular recess or wicker 22a than it is in proximity to and inwardly of the inner annular recess or wicker 22h. The thickness of the wall of the connector C from the outermost annular recess to the innermost annular recess is gradually increased. The angle A is relatively small, and in the preferred form of the invention, it would be 0° and 50 minutes relative to the central axis of the connector C.

As will be more evident hereinafter, the taper of the bore 10 is preferably substantially uniform from its outer end inwardly, at least in the vicinity of the annular recessed 22a through 22h so that after the tube T-1 has been crimped, longitudinal pulling forces on the tube T-1 in a direction tending to pull the tube T-1 off of the coupling C will be substantially uniformly distributed through the crimps in the plurality of annular recessed or wickers 22a through 22h, thereby providing an increased holding action and a mechanical lock to prevent a separation of the tube T-1 from the connector C.

The tube T-1 is formed with a plurality of annular crimps 30*l* through 30h which are formed in the annular recesses 22*l* through 22h, respectively. The tube T-1 is formed of metal such as steel, aluminum or an alloy or any other suitable material which is capable of being rolled or otherwise formed so as to roll such crimps 30a through 30h into the annular recesses 22a through 22h, respectively. Any suitable apparatus, part of which is schematically illustrated in FIG. 1 and which includes a crimping roller 40 and a guide roller 41 may be utilized. The crimping roller 40 has a crimping section 40a which extends for substantially the full longitudinal distance of the crimping releases 22a through 22h so as to work or roll the metal of the tube T-1 into the recesses 22a through 22h to form the annular crimps 30a through 30h. Each guide roller 41 has a guide ridge 41a which is adapted to fit within the guide groove 12a to maintain the crimping roller 40 in the proper position when rotating same around the external surface of the tube T-1. In our copending U.S. application, Ser. No. 84,397, one form of apparatus which is suitable for such crimping operation is illustrated, except that the crimping roller 40 shown in FIG. 1 of this application is modified as compared to the crimping roller of said copending application.

The parts of the connector C in the right-hand portion (FIG. 1) which correspond with those in the left-hand portion have the same numerals and letters, but are preceded by the prefix "1." The tube T-2 which is shown in FIG. 1 is illustrated prior to the crimping thereof.

In carrying out the method of this invention, the tube T-1 is positioned on the connector C, preferably in a slightly flared condition so that the internal diameter of the bore 15 does not damage the O-ring 20 when the connector C is inserted into the bore 15. The tube T-1 is inserted on the connector C until the end 15a of the tube T-1 is in contact with the shoulder 12c. At that point, suitable apparatus such as the crimping roller 40 and the guide roller or rollers 41 are utilized, as heretofore explained, to roll the portion of the tube T-1 overlying the annular recesses or wickers 22l through 22h to form the crimps 30a through 30h.

As heretofore explained, because of the taper on the inner surface of the bore 10 of the connector C, the thickness of the connector C is less at its outer end than it is at its inner portion so that the thickness gradually increases from the outer end inwardly. Thus, when a longitudinal pull or strain is placed upon the tube T-1 the strain is distributed to all of the crimps 30a through 30h substantially uniformly so as to thereby increase the holding action as compared to the imposition of such pulling force or load on a single crimp.

The rollers 40 and 41 also serve to roll the metal of the tube T-1 into firm sealing engagement with the O-ring seal 20 so as to provide a fluid-tight seal between the connector C and the tube T-1. Thus, the tube T-1 is mechanically locked to the connector C, and it is held in fluid-tight relationship therewith. At the same time, there is no obstruction or external enlargement formed on the tube T-1 which would interfere with the running of the tube T-1 in a well or any other operation where an enlargement or external obstruction would interfere with such use.

The tube T-2 is connected in the same manner as the tube T-1, and when so connected, the load acting thereon longitudinally is distributed to the crimps formed in the tube T-2 in the same manner as explained heretofore in connection with the crimps 30a through 30h for the tube T-1. The O-ring 120 provides a fluid-tight seal for the tube T-2 in the same manner as the O-ring 20 provides a seal as previously explained.

The foregoing disclosure and description of the invention are illustrative and explanatory thereof, and various changes in the size, shape, and materials as well as in the details of the illustrated construction may be made without departing from the spirit of the invention.

We claim:

1. A tubing connection between an end of a tube and a connector, comprising:

a connector having a plurality of external annular projections with annular recessed therebetween, and an inner bore which is tapered from one end of said recesses to the other, with all of said annular projections being of substantially the same diameter and with the depth of all of said recesses being substantially the same, and with the least thickness of the wall of the connector being at the outer one of said recesses and with the greatest thickness of the wall of the connector being at the inner one of said recesses;

a metallic tube having a bore in which said connector is positioned; and a plurality of permanently deformed annular crimps in said tube aligned with and extending to a substantially uniform depth into said recesses for engagement with said projections, whereby longitudinal pulling on said tube relative to said connector results in the pulling forces being substantially uniformly distributed to all of said crimps and projections.

2. The structure sit forth in claim 1, wherein said connector has an annular seal ring groove and including:

a resilient seal ring disposed in said groove and forming a fluid-tight seal between said connector and said tubing; and said tube is formed with an annular reduced diameter portion at said crimps only and disposed longitudinally inwardly from said seal ring and groove.

3. The structure set forth in claim 1, wherein said connector includes:

an annular shoulder against which the end of said tube is disposed to limit movement of the tube inwardly relative to the connector.

4. The structure set forth in claim 1, wherein:

said connector has an intermediate guide groove section having an external diameter which is approximately the same as the external diameter of said tube, and which has an annular guide groove formed therein.

5. The structure set forth in claim 1, wherein said plurality of recesses includes:

at least five annular recesses formed side by side on the external surface of said connector.

6. The structure set forth in claim 1, wherein:

said connector has substantial duplicates of said plurality of recesses over which the end of a second tube is positioned and the bore of said connector is tapered; and a plurality of annular crimps in said second tube aligned with and extending into said substantial duplicates of said plurality of recesses.

* * * * *